United States Patent [19]

Payne

[11] Patent Number: 4,816,647
[45] Date of Patent: Mar. 28, 1989

[54] POWER CONTROL FOR APPLIANCE HAVING A GLASS CERAMIC COOKING SURFACE

[75] Inventor: Thomas R. Payne, Louisville, Ky.

[73] Assignee: General Electric Company, Louisville, Ky.

[21] Appl. No.: 120,465

[22] Filed: Nov. 13, 1987

[51] Int. Cl.[4] ............................................... H05B 1/02
[52] U.S. Cl. ..................................... 219/464; 219/483; 219/485; 219/492; 219/508; 307/38; 307/41
[58] Field of Search .............................. 219/483–486, 219/501, 449, 450, 492, 493, 494, 508, 509; 307/117, 38–41; 323/235, 236, 319

[56] References Cited

U.S. PATENT DOCUMENTS

| | | | |
|---|---|---|---|
| 4,046,991 | 9/1977 | Sefton et al. | 219/497 |
| 4,282,422 | 8/1981 | Payne et al. | 219/486 |
| 4,443,690 | 4/1984 | Payne et al. | 219/506 |
| 4,493,980 | 1/1985 | Payne et al. | 219/450 |
| 4,551,618 | 11/1985 | Payne | 219/510 |

Primary Examiner—M. H. Paschall
Attorney, Agent, or Firm—H. Neil Houser; Radford M. Reams

[57] ABSTRACT

An improved power control system for a household cooking appliance of the type having a glass ceramic cooking surface and at least one radiant heating unit disposed beneath the cooking surface operable at a plurality of user selectable power settings. At least one of the power settings has associated with it predetermined maximum and minimum reference temperatures defining a temperature band representative of the steady state temperature range for the glass ceramic support surface proximate the heating unit when heating normal loads at that power setting. The power control system includes an arrangement for sensing the temperature of the glass ceramic cooking surface proximate the heating unit and is operative to operate the heating unit at a power level other than the power level corresponding to the user selected power setting when the sensed glass ceramic support surface temperature is outside the predetermined reference temperature band associated with the selected power setting to more rapidly bring the temperature within the band and thereby causing the heating unit to respond quickly to changes in user selected power setting.

7 Claims, 13 Drawing Sheets

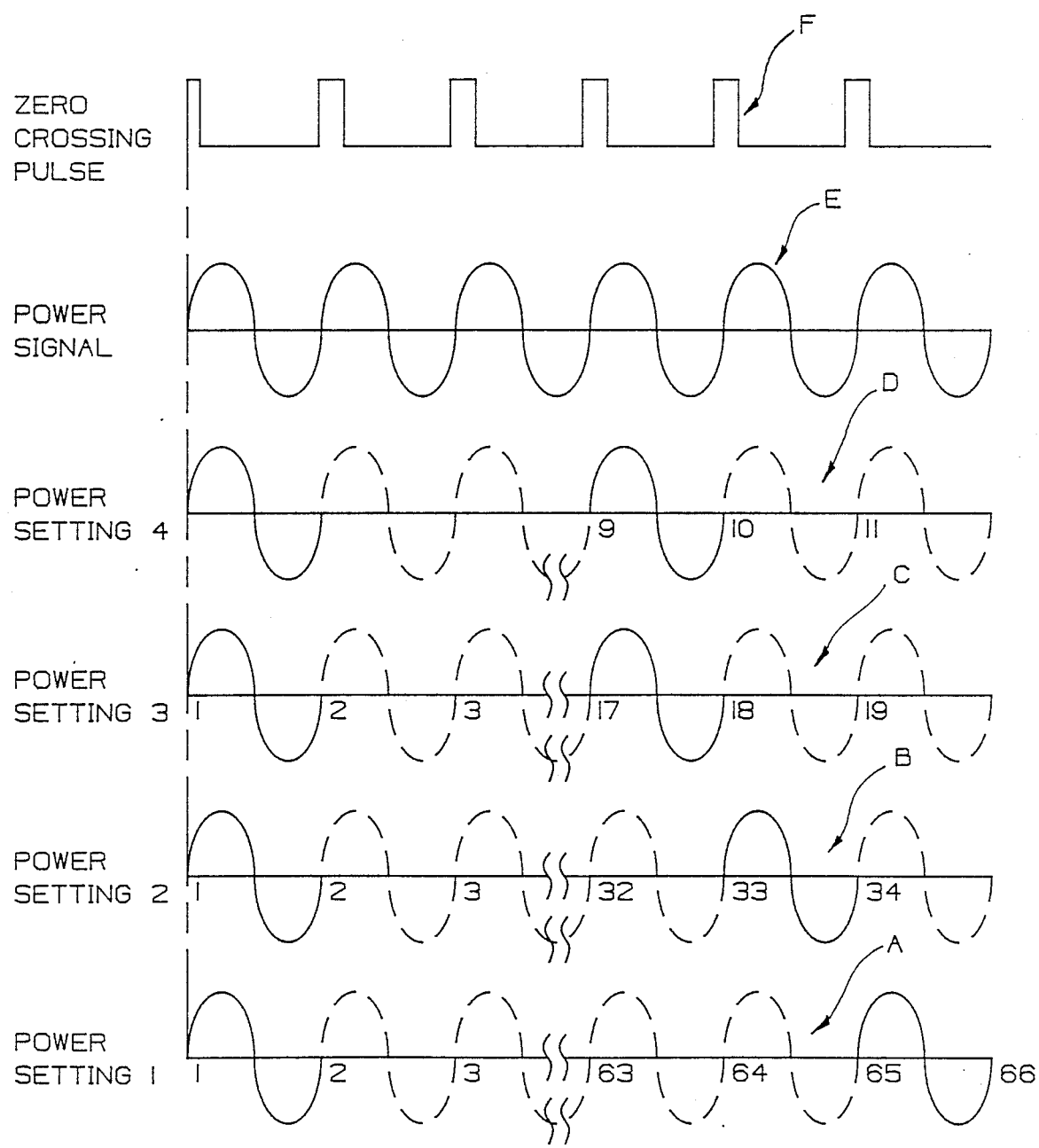

FIG. IIC
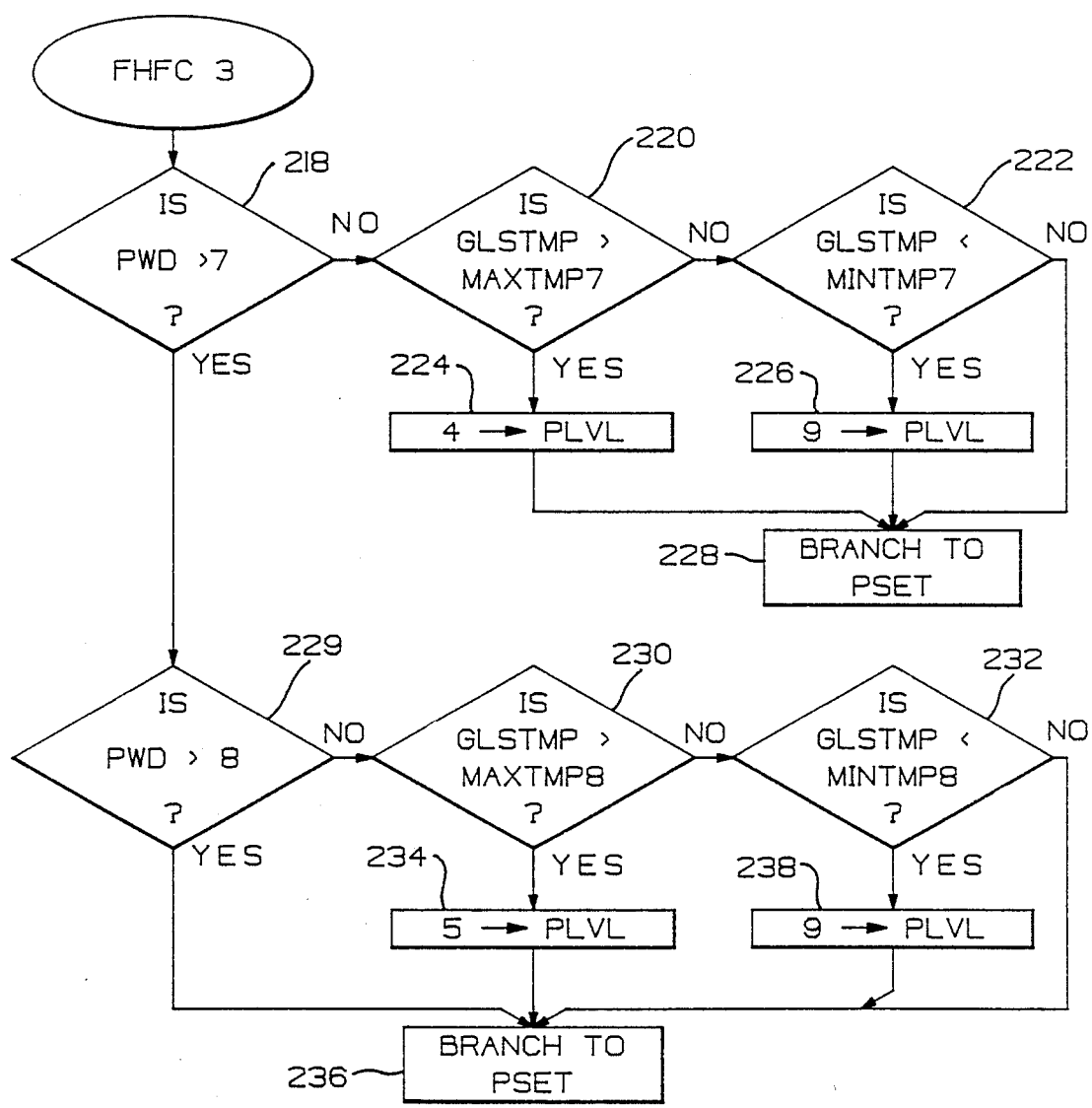

POWER CONTROL FOR APPLIANCE HAVING A GLASS CERAMIC COOKING SURFACE

BACKGROUND OF THE INVENTION

This invention relates generally to glass ceramic cooktop appliances and particularly to electronic power control systems for such appliances.

Commonly assigned U.S. Pat. No. 4,740,664 to Payne et al, which is hereby incorporated by reference, discloses a cooktop appliance equipped with heating units which radiate substantially in the infrared region (1–3 microns) in combination with a glass ceramic cooktop support surface which is substantially transparent to infrared radiation. Utensils placed on the cooktop surface are heated primarily by radiation directly from the heating unit rather than by conduction from the glass ceramic material. Though the glass ceramic is substantially transparent to the radiation, a portion of the energy radiating from the heating unit is absorbed by the glass ceramic, as is a portion of the energy reflected by the utensil being heated. Heat transfer from the glass ceramic is primarily by conduction to the utensil.

The power control system disclosed in the aforementioned Payne et al patent, using glass ceramic temperature information derived from a temperature sensor located directly over each heating unit controls the output power of each heating unit to protect the glass ceramic against overheating caused by abnormal load conditions such as operating the unit with no utensil present, use of badly warped utensils, or heating an empty utensil.

In that arrangement the temperature measurements are obtained by measuring the resistance of the bottom surface of the glass ceramic material above the heating units. The temperature information so obtained is sufficiently accurate for protecting the glass ceramic against overheating.

Since radiation is the primary heat transfer mechanism for utensils being heated on such cooktops, the system responds more quickly to changes in user selected power settings than the conventional cooktops relying on conduction heating. However, the thermal inertial of the glass ceramic material results in a slower response than that achievable with closed loop automatic surface unit systems which measure utensil temperature directly and control the output power of the heating unit to achieve and maintain the user selected utensil temperature. Inherent inaccuracies in this temperature measurement system due to the temperature gradient through the glass ceramic material, the temperature gradient from the top of the glass ceramic material to the bottom of the potentially warped pan, and other sources of error, render this temperature sensor arrangement incompatible with such closed loop systems. Locating a sensor to directly sense utensil temperature would add cost and complexity to the manufacturing process and by protruding above the cooktop would negate at least to some extent the appearance and cleanability advantages of the smooth cooktop surface. Hence, there exists a need for a control arrangement which provides a faster response to changes in power setting than that of typical open loop control systems while retaining the advantages in cost, cleanability and appearance of the smooth glass ceramic cooktop surface.

Therefore, it is a primary object of the present invention to provide an improved power control system for a glass ceramic cooktop appliance which reduces the time required for the system to reach steady state conditions in response to changes in the user selected power setting using a temperature sensor mounted to the bottom or inner surface of the glass ceramic cooktop support surface.

SUMMARY OF THE INVENTION

In accordance with the present invention an improved power control system is provided for a household cooking appliance of the type having a glass ceramic cooking surface for supporting loads to be heated and at least one radiant heating unit disposed beneath the glass ceramic cooking surface to heat loads supported thereon. User actuable input selection means enables the user to select one of a plurality of power settings for the heating unit. The power control system includes temperature sensing means for sensing the temperature of the glass ceramic cooking surface proximate the heating unit, and power control means responsive to the input selection means and to the temperature sensing means and operative to normally operate the heating unit at a power level corresponding to the user selected power setting.

Advantageous use is made of the novel discovery that for at least some of the user selectable power settings, the steady state temperature of the glass ceramic surface will come within a predictable temperature band for substantially all normal loads when the heating unit is operated at the corresponding power level. To this end, at least one of the plurality of power settings has associated with it predetermined maximum and minimum reference temperatures defining a temperature band representative of the steady state temperature range for the underside of the glass ceramic support surface proximate the heating unit when heating normal loads at that power setting. The power control means is further operative to operate the heating unit at a power level other than the power level corresponding to the user selected power setting when the sensed glass ceramic support surface temperature is outside the predetermined reference temperature band associated with the selected power setting to more rapidly bring the temperature within the band and thereby causing the heating unit to respond quickly to changes in user selected power setting.

In a preferred form of the invention the minimum reference temperature for each power setting represents the temperature level which the glass ceramic will normally at least reach under steady state conditions when heating a relatively dark flat bottomed utensil at the steady state power level for the selected power setting. The maximum reference temperature for that setting corresponds to the temperature which would normally not be exceeded by the glass ceramic material when heating a shiny aluminum utensil having a warped bottom surface at the corresponding power level.

While the novel features of the invention are set forth with particularity in the appended claims, the invention both as to organization and content will be better understood and appreciated from the following detailed description taken in conjunction with the drawings.

BRIEF DESCRIPTION OF THE DRAWINGS

FIG. 5 illustrates power signals corresponding to various operator selectable power settings and a timing signal for sychronizing control system operation with the power signal;

FIGS. 11A-11C are flow diagrams of the Temp FH/FC routine incorporated in the control program of the microprocessor in the circuit of FIG. 7;

DETAILED DESCRIPTION OF THE ILLUSTRATIVE EMBODIMENT

Figure 1:
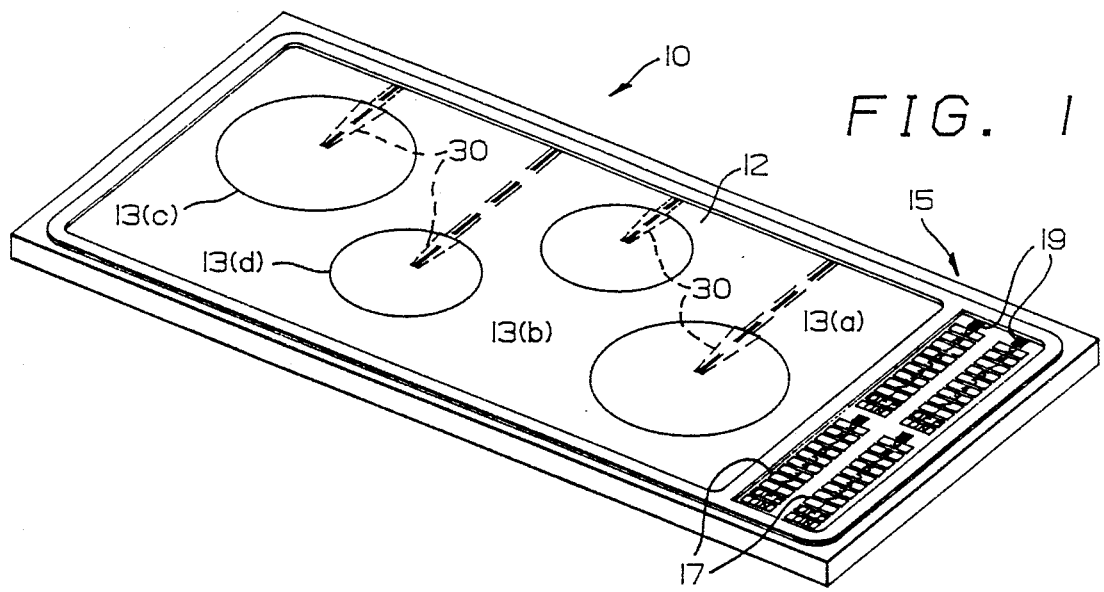
FIG. 1 is a front perspective view of a portion of a cooktop illustratively embodying the power control system of the present invention.

FIG. 1 illustrates a glass-ceramic cooktop appliance designated generally 10. Cooktop appliance 10 has a generally planar glass-ceramic cooking surface 12. Circular patterns 13(a)-13(d) identify the relative lateral positions of each of four heating units (not shown) located directly underneath surface 12. A control and display panel generally designated 15 includes a complete set of touch control keys 17 and a seven-segment digital LED display element 19 for each heating unit.

The term glass-ceramic with reference to the material comprising cooktop surface 12 refers to a boron silicate material such as the Ceran family of materials. In particular in the illustrative embodiment the glass-ceramic material is an infrared transmissive glass-ceramic material designated Ceran-85 manufactured by Schott, Incorporated.

Figure 2:
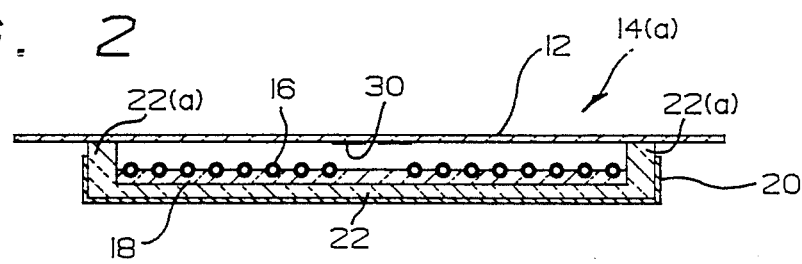
FIG. 2 is a sectional side view of a portion of the cooktop of FIG. 1 showing details of one of the heating units.
Figure 3:
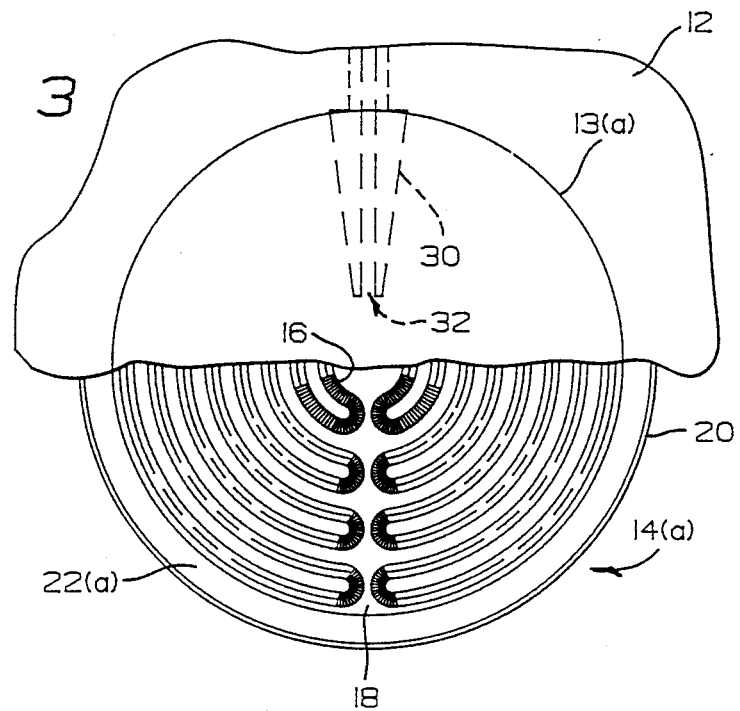
FIG. 3 is an enlarged top view of a portion of the cooktop of FIG. 1 showing details of the temperature sensor and the heating unit.

A heating unit is disposed beneath each of the circular patterns 13(a)-13(d). In the discussion to follow the designators 14(a)-14(d) shall be understood to refer to the heating unit disposed under patterns 13(a)-13(d) respectively. Surface unit 14(a) is shown in greater detail in FIGS. 2 and 3. For purposes of illustration only one of the heating units is shown. It will be understood that heating units 14(b)-14(d) are similar in structure to that shown in FIGS. 2 and 3. Heating units 14(a) and 14(c) are 8 inches in diameter. Units 14(b) and 14(d) are 6 inches in diameter.

Referring again to FIGS. 2 and 3, heating unit 14(a) comprises an open coil electrical resistance element 16 of spiral configuration, which is designed when fully energized to radiate primarily in the infrared (1-3 micron) region of the electromagnetic energy spectrum. Element 16 is arranged in a concentric coil pattern and staked or otherwise secured to a support disk 18 formed of Micropore material such as is available from Ceramaspeed under the name Microtherm. Disk 18 is supported in a sheet metal support pan 20, by an insulating liner 22 formed of an aluminum oxide, silicon oxide composition. This insulating liner 22 includes an annular upwardly extending portion 22(a) which serves as an insulating spacer between base 18 and the glass-ceramic cooktop 12. When fully assembled, pan 20 is spring loaded upwardly forcing the annular portion 22(a) of insulating liner 22 into abutting engagement with the underside of cooktop 12 by support means not shown. Heating units 14(a)-14(d) are manufactured and sold commercially by Ceramaspeed under the part name Fast Start Radiant Heater with Concentric Coil Pattern.

Figure 4:
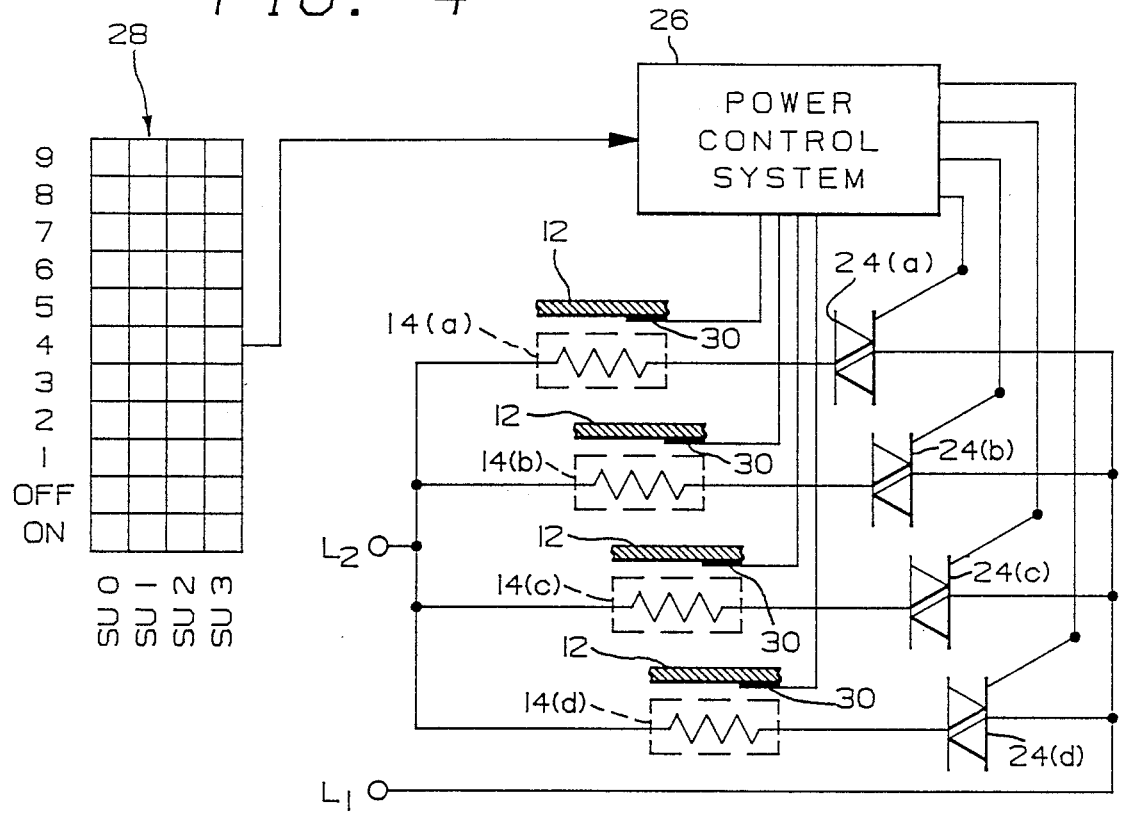
FIG. 4 is a functional block diagram of the power control circuitry for the cooktop of FIG. 1.

FIG. 4 illustrates in simplified schematic form an embodiment of a system to be controlled in accordance with the present invention. Each of four heating units 14(a)-14(d) is coupled to a standard 240 volt, 60 Hz AC power source via power lines L1 and L2 through one of four triacs 24(a)-24(d) respectively, the heating circuits being connected in parallel arrangement with each other. Triacs 24(a)-24(d) are conventional thyristors capable of conducting current in either direction irrespective of the voltage polarity across their main terminals when triggered by either a positive or negative voltage applied to the gate terminals.

The power control system 26 controls the power applied to the heating units by controlling the rate at which gate pulses are applied to the triac gate terminals in accordance with power setting selections for each heating unit entered by user actuation of tactile touch membrane switch keyboard 28. The columns of keys designated SU0 through SU3 provide the control inputs for heating units 14(a)-14(d) respectively. In the illustrative embodiment power pulses applied to the heating units are full cycles of the 240 volt, 60 Hz AC power signal; however, power signals of different frequencies and voltage levels such as 120 volts could be similarly used.

A plurality of discrete power settings are provided, each having uniquely associated with it a particular power pulse repetition rate. In the illustrative embodiment nine power settings plus Off and On are selectable for each heating unit by user actuation of the keys in keyboard 28. Table I shows the pulse repetition rate associated with each power setting.

TABLE I

| Power Settings | Power Level | Power Pulse Repetition Rate | Look Up Table | | | | |
|---|---|---|---|---|---|---|---|
| | | | Address | Power Pulse Code | | | |
| OFF | 0 | — | TBLADDR | 0000 | 0000 | 0000 | 0000 |
| ON | 0 | — | TBLADDR | 0000 | 0000 | 0000 | 0000 |
| 1 | 1 | 1/64 | TBLADDR +8 | 8000 | 0000 | 0000 | 0000 |
| 2 | 2 | 1/32 | TBLADDR +10 | 8000 | 0000 | 8000 | 0000 |
| 3 | 3 | 1/16 | TBLADDR +18 | 8000 | 8000 | 8000 | 8000 |

TABLE I-continued

| Power Settings | Power Level | Power Pulse Repetition Rate | Look Up Table Address | Power Pulse Code | | | |
|---|---|---|---|---|---|---|---|
| 4 | 4 | 1/8 | TBLADDR +20 | 8080 | 8080 | 8080 | 8080 |
| 5 | 5 | 10/64 | TBLADDR +28 | 8088 | 8080 | 8088 | 8080 |
| 6 | 6 | 15/64 | TBLADDR +30 | 8888 | 8888 | 8888 | 8880 |
| 7 | 7 | 21/64 | TBLADDR +38 | AA88 | A888 | A888 | A888 |
| 8 | 8 | 28/64 | TBLADDR +40 | AA8A | AA8A | AA8A | AA8A |
| 9 | 9 | 36/64 | TBLADDR +48 | EAAA | EAAA | EAAA | EAAA |
|   | A | 41/64 | TBLADDR +50 | EEEA | EAEA | EAEA | EAEA |
|   | B | 45/64 | TBLADDR +58 | EEEE | AEEE | EAEE | EEAE |
|   | C | 51/64 | TBLADDR +60 | FEEE | EEEE | FEEE | FEEE |
|   | D | 55/64 | TBLADDR +68 | FEFE | FEFE | FEFE | FEEE |
|   | E | 59/64 | TBLADDR +70 | FFEF | FEFF | EFFE | FFEF |
|   | F | 64/64 | TBLADDR +78 | FFFF | FFFF | FFFF | FFFF |

The power pulse code in Table I represents 64-bit control words in hexadecimal format. The distribution of ON power cycles over a 64 cycle control period for each power setting is defined by the bit pattern of the associated control word. On and OFF cycles are represented by logical one and logical zero bits respectively. These repetition rates have been empirically established to provide a range of power settings for good cooking performance in the appliance of the illustrative embodiment. The bit patterns have been selected to minimize the duration of idle or OFF cycles for each power level.

In FIG. 5 waveforms A–D represent the voltage applied to the heating element for each of power settings 1 through 4 respectively. Wave form E represents the power signal appearing across lines L1 and L2. Power pulses or ON cycles are represented by full lines. Those cycles of the power signal during which the triac is non-conductive are shown in phantom lines. As shown in Table I and FIG. 5, the pulse repetition rate for the first four power settings range from 1 pulse per 64 power cycles for power setting 1, the lowest non-Off power setting to 1 power pulse for every 8 cycles for power level 4.

The maximum user selectable power setting, level 9, corresponds to a repetition rate of 36 cycles per 64 cycles to permit the heating unit to be designed for steady state operation at an effective voltage which is lower than the 240 volt line voltage as is described in greater detail in commonly assigned co-pending patent application Ser. No. 000,426 filed Jan. 5, 1987, now pending, for Thomas R. Payne, the disclosure of which is hereby incorporated by reference.

A temperature sensor for measuring the temperature of the glass ceramic support surface is provided in the illustrative embodiment in the form of four pairs of precious metal strips 30 formed on the underside of glass-ceramic plate 12. One pair is associated with each heating unit. Strips 30 serve as electrical contacts and the glass-ceramic material in the gap 32 between the strips is a resistance, the value of which varies as a function of the temperature of the glass.

Strips 30 may be silk screened and fired onto the underside of the glass-ceramic cooktop 12 at a temperature of about 1300° F. Strips 30 are built up to a thickness of about 50 to 100 angstroms and extend from the outer edge of cooktop surface 12 nearly to the center of each of the circular patterns 13(a)–13(d). The strips are spaced apart a distance of approximately 0.3 inches. The approximate length of each strip is 3 inches and 4 inches for the 6" and 8" heating units respectively. The minimum width of each strip is 0.1 inches. Such a construction gives a finite measurable resistance value for each strip conductor. The resistance of the strips is not critical provided it is small, but a value in the range of 1–10 ohms is preferred. Gold is used in the illustrative embodiment to form the strips 30; however, it will be appreciated that other precious metals and combinations thereof such as gold palladium combinations or the like could be similarly employed. The particular tapered pattern for strips 30 in the illustrative embodiment was selected somewhat arbitrarily for enhanced appearance since that portion of the strips which extends over the heating unit will be visible through the cooktop when the heating units are operating. This pattern is not essential for proper operation.

An improved method for applying strips to the glass ceramic surface is disclosed in commonly assigned co-pending U.S. patent application Ser. No. 091,528, filed Aug. 31, 1987, now pending, by Schulz.

Figure 6:
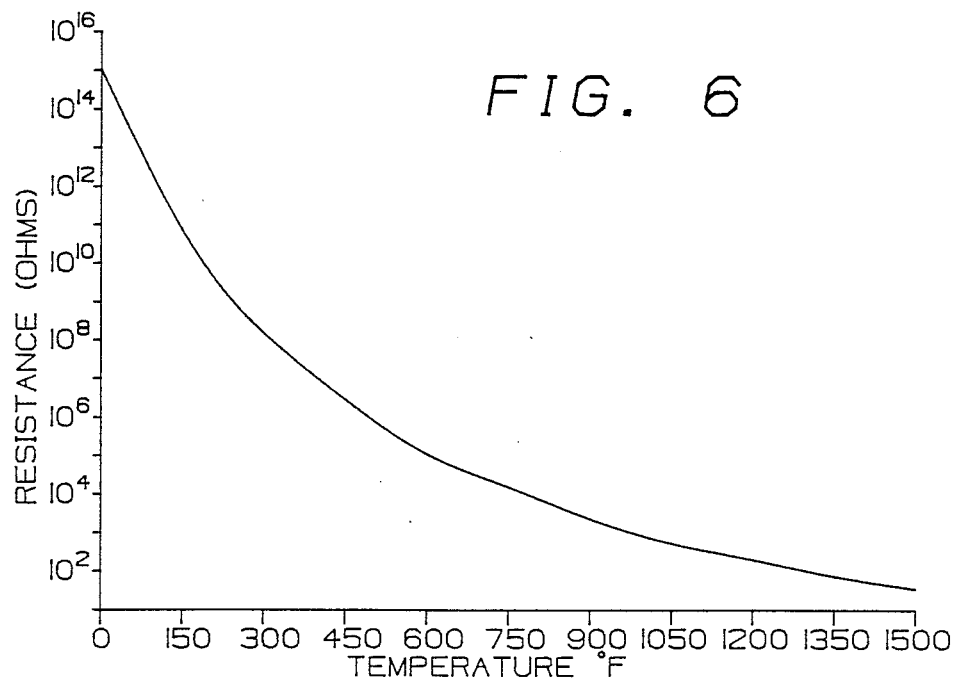
FIG. 6 is a graphic representation of the resistance vs. temperature characteristic for the glass-ceramic material forming the surface of the cooktop of FIG. 1.

The resistance between strips 30 is a function of the distance between the strips, the length, glass-ceramic thickness, cooktop material as well as the temperature. The temperature vs. resistance characteristic of the glass-ceramic material comprising the temperature sensor of the illustrative embodiment is graphically represented in FIG. 6. At the maximum temperature of 1300° F. (700° C.) the resistance of the glass-ceramic is approximately 200 ohms. At room temperature the resistance of the glass-ceramic is in the multi-megaohm range.

As hereinbefore briefly described, the main heat transfer mechanism in the cooktop of the illustrative embodiment is radiation from the heating unit to the utensil through the glass. The glass-ceramic is substantially transparent to infrared radiation; however, not totally so. Thus, a portion of the energy radiating from the heating unit is absorbed by the glass-ceramic. Similarly, a portion of the energy reflected from the utensil is also absorbed by the glass-ceramic. Consequently, the conduction from glass ceramic surface to the utensil makes a significant contribution to the heating of the utensil. Thus, the thermal inertia of the glass ceramic material slows the response of the heating system to changes in the user selected power setting.

It will be recalled that an object of the present invention is to cause the system to respond more quickly, that is, to reach steady state heating conditions more quickly in response to changes in the selected power setting. To meet this objective, advantageous use is made of a novel and unexpected empirical observation that for each power level, under steady state conditions the temperature of the underside of the glass ceramic material supporting a utensil load to be heated will come within a corresponding relatively wide but predictable temperature band or range for substantially all normal utensil loads being heated on the glass ceramic surface. Table II shows the minimum and maximum temperatures which define the bands for power levels 4–7 of the illustrative embodiment.

As used herein, the phrase "normal load" refers to a range of utensils likely to be heated on the cooktop. At one extreme are dark flat bottomed Corningware type pans and at the other extreme are warped shiny aluminum pans. The dark flat Corningware type of pans provide the most efficient heat transfer from the glass ceramic material. The phrase "Corningware type" refers to pans made of ceramic material, available under a variety of names. For a given power setting the measured glass ceramic temperature will be lowest for this type of pan. The warped bright metal pan provides poor heat transfer by conduction and also tends to reflect radiant energy back toward the glass ceramic and thus establishes the high temperature end of the band.

TABLE II

| Steady State Power Level | Overdrive Level | Underdrive Level | Fast Heat Threshold | Fast Cool Threshold |
| --- | --- | --- | --- | --- |
| 1 | — | 0 | — | 350° F. |
| 2 | — | 0 | — | 350° F. |
| 3 | — | 0 | — | 350° F. |
| 4 | 6 | 2 | 280° F. | 650° F. |
| 5 | 7 | 3 | 340° F. | 710° F. |
| 6 | 9 | 3 | 400° F. | 840° F. |
| 7 | 9 | 4 | 480° F. | 960° F. |
| 8 | 9 | 5 | 600° F. | 1050° F. |
| 9 | — | — | — | — |

The minimum temperatures in Table II were derived from empirical testing using a 8" size flat dark Everware pan containing 2 liters of water; the maximum temperatures were derived using a 6" size shiny aluminum pan with a severely warped bottom containing ¼ liter of water.

In accordance with the present invention, the control system includes means responsive to the temperature sensing means operative to apply a power level other than the steady state power level corresponding to the user selected power setting, when the sensed temperature of the glass ceramic material is outside the corresponding steady state temperature band. When the sensed glass ceramic temperature is less than the minimum threshold temperature defining the lower limit of the temperature band for the selected power setting, the heating unit is overdriven, that is, a power level higher than the steady state power level for the selected power setting is applied to the unit. Similarly, when the sensed glass ceramic temperature is greater than the maximum threshold temperature defining upper limit of the temperature band for the selected power setting, the heating unit is underdriven, that is, a power level less than the steady state power level is applied to the heating unit. When the sensed glass ceramic temperature is within the corresponding steady state temperature band, the power level corresponding to the selected power setting is applied to the heating unit. By this arrangement, the glass temperature is more rapidly brought within the temperature band associated with the selected power level than would be the case with a conventional open loop control arrangement.

In the illustrative embodiment, resistance of the glass when operating at the power levels 1–3 is so high that reliable measurement of usable temperatures requires very expensive circuitry. Thus, the overdrive or fast heat mode is not implemented for these power settings. The maximum reference temperature for power level 3 is used to implement the underdrive or fast cool mode for power levels 1–3. Power setting 9 is the maximum setting for which the unit is designed. Thus, no overdriving is implemented in response to selection of this power level.

Table II also shows the power levels applied for overdriving and underdriving the units for each power setting. These power levels have been empirically selected to provide satisfactory performance in the cooktop of the illustrative embodiment. The objective in choosing these levels is to bring the temperature to within the desired limits quickly but without overshoot.

It will be appreciated that the specific temperature and power level parameters described in Table II are intended to be illustrative only and not intended to be limitations on the invention.

Figure 7:
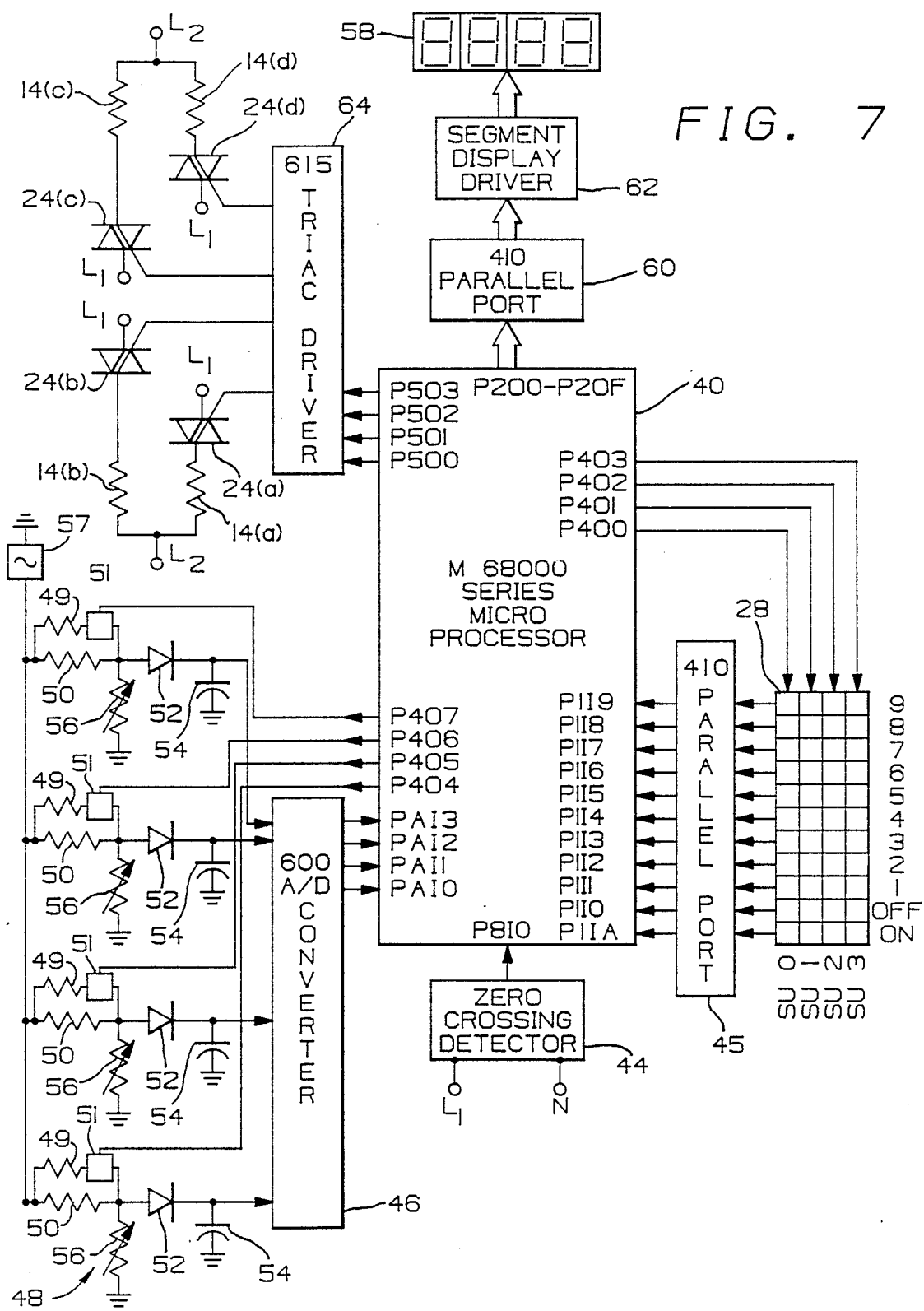
FIG. 7 is a simplified schematic diagram of a control circuit illustratively embodying the power control system of the present invention as embodied in the cooktop of FIG. 1.

FIG. 7 schematically illustrates an embodiment of a power control circuit for the cooktop of FIG. 1 which performs the power control function in accordance with the present invention. In this control system power control is provided electronically by microprocessor 40. Microprocessor 40 is a M68000 series microprocessor of the type commercially available from Motorola. Microprocessor 40 has been customized by permanently configuring its read only memory to implement the control scheme of the present invention.

As previously described with reference to FIG. 4, keyboard 28 is a conventional tactile touch type entry system. The keyboard array comprises four columns of 11 keys each. Columns for controlling heating elements are designated SU0 through SU3 respectively. The keys enable a user to select power levels 1 through 9 in addition to On and Off for each of the four heating units. Keyboard 28 has one input line for each column commonly shared by all keys in that column and 11 output lines, one for each row of keys. Each particular column of keyboard 28 is scanned by periodically generating scan pulse sequentially at outputs P400 through P403 of microprocessor 40. These pulses are transmitted as they appear to the corresponding column input lines of keyboard 28. This voltage is transmitted essentially unchanged to the output lines of all the untouched keys. The output of an actuated key will differ, signifying actuation of the key in that row and column.

In this manner each column of keyboard 28 is scanned for a new input periodically at a rate determined by the control program stored in the ROM of microprocessor 40. As will become apparent from the description of the control routines which follow, each column is scanned once every four complete power cycles of the power signal appearing on lines L1 and N. The output from keyboard 28 is coupled to input ports P1I0-P1IA of microprocessor 40 via a 410 parallel port interface circuit.

A zero crossing signal marking zero crossings of the power signal appearing on lines L1 and N from the power supply is input to microprocessor 40 at input port P8I0 from a conventional zero crossing detector circuit 44. The zero crossing signal from circuit 44 is illustrated at wave form F of FIG. 5. The pulses mark the positive going zero crossings of the power signal across lines L1 and N of the AC power supply. The zero crossing signals are used to synchronize the triggering of the triacs with zero crossings of the power signal and for timing purposes in the control program executed by microprocessor 40.

Glass cooktop temperature information is provided to microprocessor 40 at input ports PAI0 through PAI3 via a standard VME 600 A-D converter circuit 46. An analog voltage signal representative of the temperature of the glass-ceramic in the vicinity of each heating unit is provided via temperature sensor voltage bridge network 48 comprising for each heating unit, a 2K resistor 49 connected in parallel with 200K resistor 50, via an analog multiplexer circuit 51 serially connected to resistor 49, an isolating diode 52, and a 10 uf filter capacitor 54. The resistance of the glass-ceramic is represented schematically as variable resistor 56 coupled between the junction of resistor 50 and diode 52 and ground. The other side of resistor 50 is coupled to an AC supply source 57. AC supply 57 is used to drive the glass-ceramic sensor resistance circuitry in order to minimize parasitic and diffusion affects. The analog voltage signal applied to the input of the A—D converter from each individual sensor circuit is converted internally to a digitized value which is stored in the RAM of microprocessor 40.

Analog multiplexer circuit 51 is connected in series with current limiting resistor 49 to effectively expand the temperature range of the sensing circuit. Multiplexer circuits 51 act as analog switches triggered by enable signals from output ports P404–P407 to selectively switch the 2K ohm resistor into the sensing circuit. If only 2K resistor 49 is employed, the temperature readings at the low end of the range are difficult to resolve. As will be hereinafter described in greater detail in the description of the control routines, when the sensed temperature is above a predetermined threshold temperature arbitrarily set at 750° F., an enable signal is transmitted from the appropriate one of I/O ports P404–P407 to its associated multiplexer circuit 51 to switch in the lower resistor 49 before reading in the temperature for measurement purposes. For temperatures less than the threshold temperature, the I/O port is reset, effectively switching resistor 49 out of the circuit.

Microprocessor 40 transmits triac trigger signals from I/O ports P500 through P503 to the gate terminals of triacs 24(a)–24(d) respectively via a conventional 615 triac driver circuit. Triac driver circuit 64 amplifies the outputs from ports P500–P503 of microprocessor 40 and isolates the chip from the power line. Display data is transmitted from I/O ports P200–P20F. Display 58 is a conventional four digit display, each digit comprising a 7-segment LED display. Display information is coupled from I/O ports P200–P20F to the display segments via a conventional 410 parallel port interface circuit 60 and a conventional segment display decoder driver circuit 62 in a manner well known in the art.

It will be recalled that microprocessor 40 is customized to perform the control functions of this invention by permanently configuring the ROM to implement a predetermined set of instructions. FIGS. 8–14 are flow diagrams which illustrate the control routines implemented in the microprocessor to obtain, store and process the input data from the keyboard and generate control signals for triggering the triacs in a manner which provides the power pulse repetition rate required for the power setting selected and the sensed glass-ceramic temperature for each of the heating units. From these diagrams one of ordinary skill in the programming art could prepare a set of instructions for permanent storage in the ROM of microprocessor 40 which would enable the microprocessor to perform the control functions in accordance with this invention.

The control program comprises a set of predetermined control instructions stored in the read only memory (ROM) of microprocessor 40. A separate file in the random access memory (RAM) of the microprocessor is associated with each of the heating units 14(a)–14(d). Each file stores the control information for its associated heating unit which is acted upon by the instructions in the ROM. Execution of the control program is synchronized with the 60 Hz power signal such than the set of control instructions in the ROM is cycled through once during each cycle of the power signal. A file register common to all four files functioning as a four count ring counter is incremented once during each pass through the control program. The count of this file register identifies the RAM file to be operated on by the control instructions during the ensuing pass through the control program. By this arrangement the control program is executed for any one particular heating unit once every four cycles of the 60 Hz power signal.

The control program is logically divided into a set of sub-routines which includes the Scan routine, the Keyboard Decode routine, the Rate Calc routine, the Rate Control routine, the Steady State routine, the TEMP FH/FC routine, the PSET routine, and the Power Out routine. It will be appreciated that other sub-routines may also be included to perform control functions unrelated to the present invention.

The Scan routine (FIG. 8), which contains the file register identifying the RAM file to be acted upon during the ensuing pass through the control program, sets the scan line for the keyboard column associated with the heating unit which is the subject of the current pass through the routine, reads the input from the keyboard, and stores the user selected power setting selection information in temporary memory. The Keyboard Decode Routine validates keyboard entries and updates the control variable representing the power level selected by the user as appropriate to reflect the most recent valid user input. The Rate Calc routine reads in the glass-ceramic cooktop temperature information, and periodically calculates the rate of change of temperature. This information is used in the Rate Control and Steady State Control routines which perform a temperature limiting function by making adjustments to the power level to be applied to the heating unit as a function of the glass-ceramic temperature, the rate of change of glass-ceramic temperature and the user selected power setting. The TEMP FH/FC routine uses the glass ceramic temperature information read in by the Rate Calc routine to overdrive or underdrive the heating units when the sensed temperature is outside of the temperature band associated with the selected power setting to speed up the response of the appliance to power setting changes in accordance with the present invention.

While the determination of what power level to be applied to the surface unit is determined only during the pass through the program for that particular heating unit, a power control decision must be made for the ensuing power cycle for each of the units during each pass through the program. The PSET routine obtains power level information from each file during each pass through the routine, performs a table look-up for each heating unit to check the appropriate bit for the power level control word for each surface unit, and generates a four bit trigger control word which identifies which heating units are to be triggered on and which are to be off during the next power cycle. This four bit control word is then used by the Power Out routine which monitors the input from the zero crossing circuit and triggers those triacs associated with surface units to be energized during the next power cycle into conduction upon detection of the next occurring positive going zero crossing of the power signal. Each of these control routines except for the Rate Control and Steady State Control routines will now be described in greater detail with reference to its flow diagram in the discussion to follow. The Rate Control and Steady State routines, which implement the temperature limiting function, are described in detail in U.S. patent application Ser. No. 000,684 hereinabove incorporated by reference.

Figure 8:
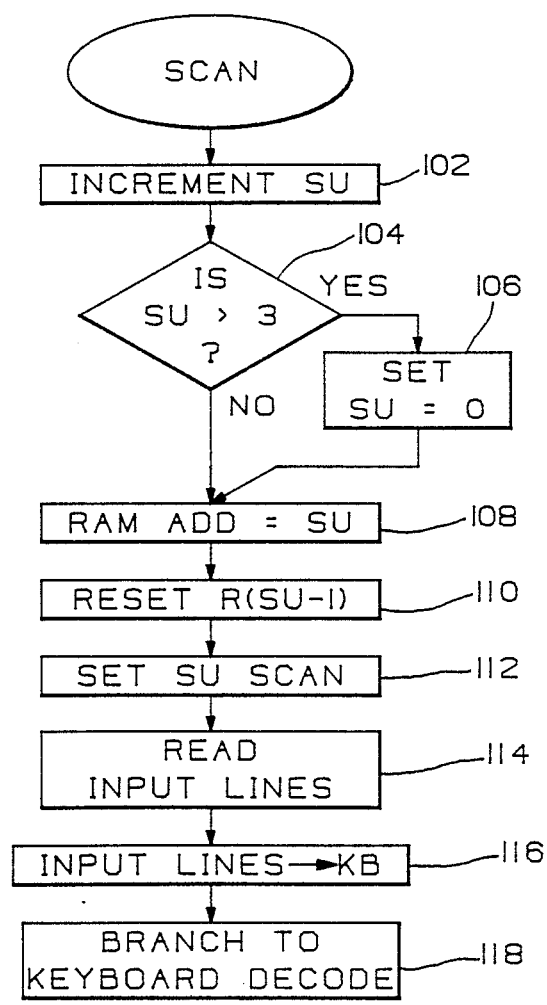
FIG. 8 is a flow diagram of the Scan routine incorporated in the control program for the microprocessor in the circuit of FIG. 7.

SCAN Routine—FIG. 8

The function of this routine is to address the appropriate RAM file for the current pass through the program, set the appropriate scan line for the keyboard, and read in the input information from the keyboard for the heating unit associated with the designated RAM file. RAM file register SU functions as a four count ring counter which counts from 0 to 3. Counts 0 through 3 of the SU counter identify RAM files for surface units 14(a)–14(d) respectively.

Upon entering the Scan routine the register SU is incremented (Block 102) and Inquiry 104 determines if SU is greater than 3. If so, the counter is reset to 0 (Block 106). Next the address of the RAM file to be acted upon during this pass through the control program is set equal to SU (Block 108). The scan line set during the previous pass through the control program designated R(SU-1) is reset (Block 110). The scan line associated with the surface unit for the current pass through the program designated R(SU) is set (Block 112). The data of input lines P1IA through 9 are read in, conveying the current input information for this RAM file from keyboard 28 (Block 114) and this information is stored as variable KB (Block 116). The program then branches (Block 118) to the Keyboard Decode routine of FIG. 9A.

Figure 9A:
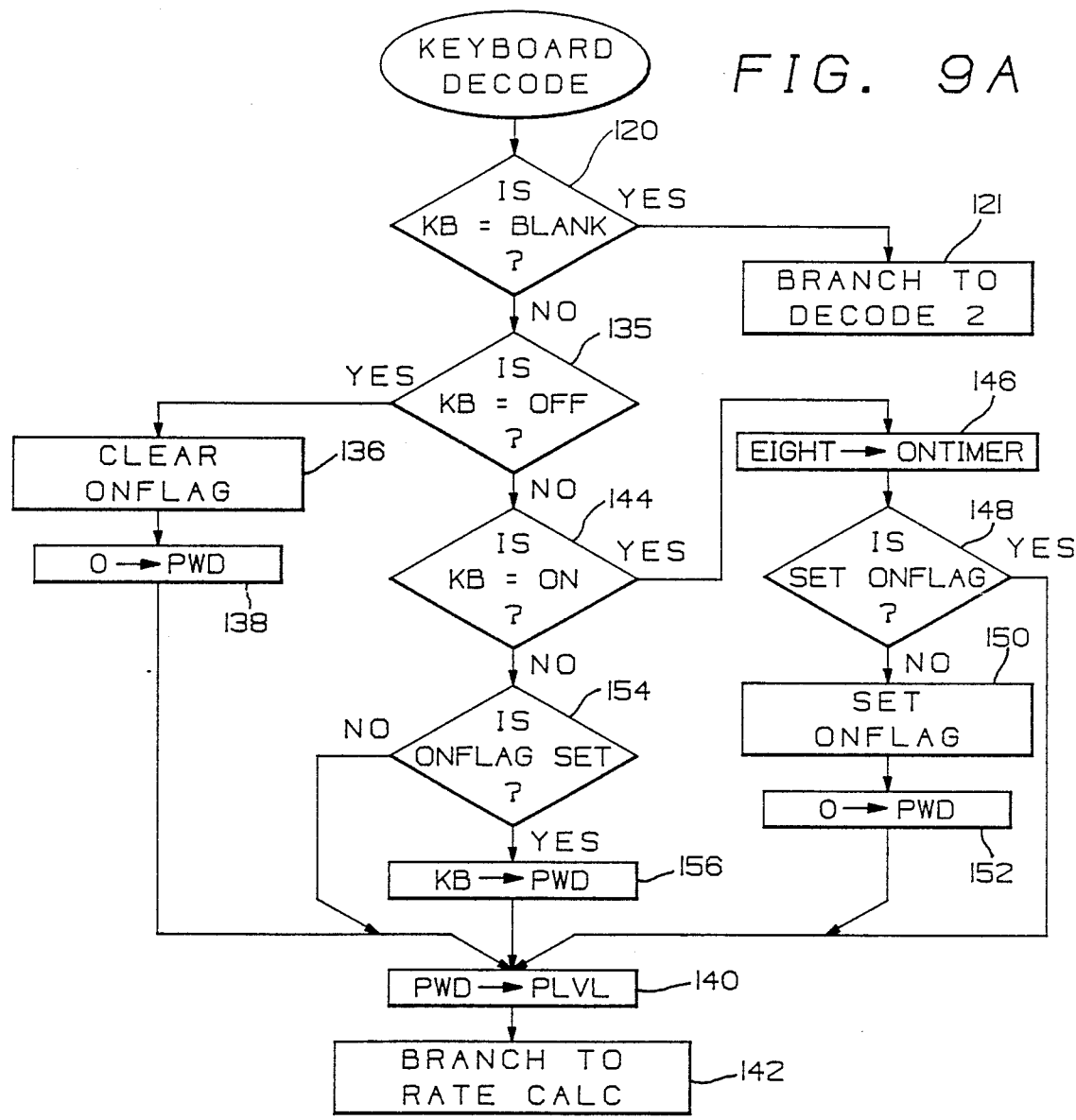
FIGS 9A and 9B are flow diagrams of the Keyboard Decode routine incorporated in the control program for the microprocessor in the circuit of FIG. 7.
Figure 9B:
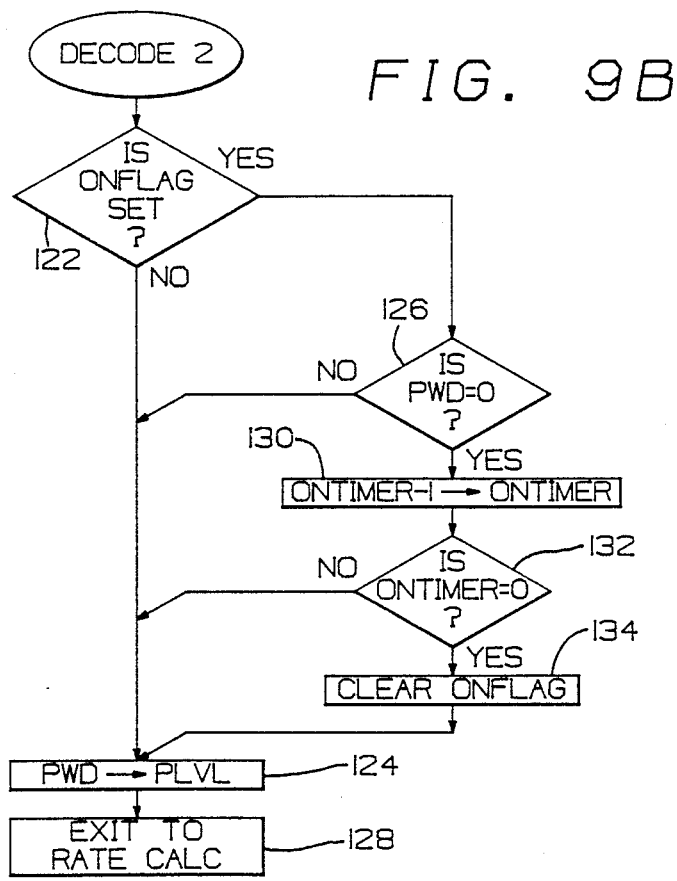

KEYBOARD DECODE Routine—FIGS. 9A and 9B

The Keyboard Decode routine validates inputs from keyboard 28 and updates the user selected power setting variable PWD accordingly. The routine first determines if the new keyboard entry is a blank signifying no input, an OFF entry, an OR entry, or one of the power levels 1 through 9. To be valid when switching the heating unit from Off to another power setting, the On key must be actuated first followed by the desired power setting. The power setting must be entered within 8 seconds of actuation of the On key. If not, the On key must be re-actuated.

The variable PWD represents the user selected power setting. PWD is only changed in response to user inputs. However, in accordance with the present invention the power level actually applied to the heating unit may be different from the level corresponding to the user selected power setting. The variable PLVL is introduced in this routine to represent the power level to be actually applied to the heating unit. PLVL is initially assigned the value of PWD. However, PLVL is subject to be changed in the control routines hereinafter described.

A flag designated the On flag and a timer or counter designated the ONTIMER are used to establish the eight second period for entering a valid power setting after actuation of the On key. The On flag is set when the On key is actuated and is only reset in response to actuation of the Off key or timing out of ONTIMER.

Figure 10:
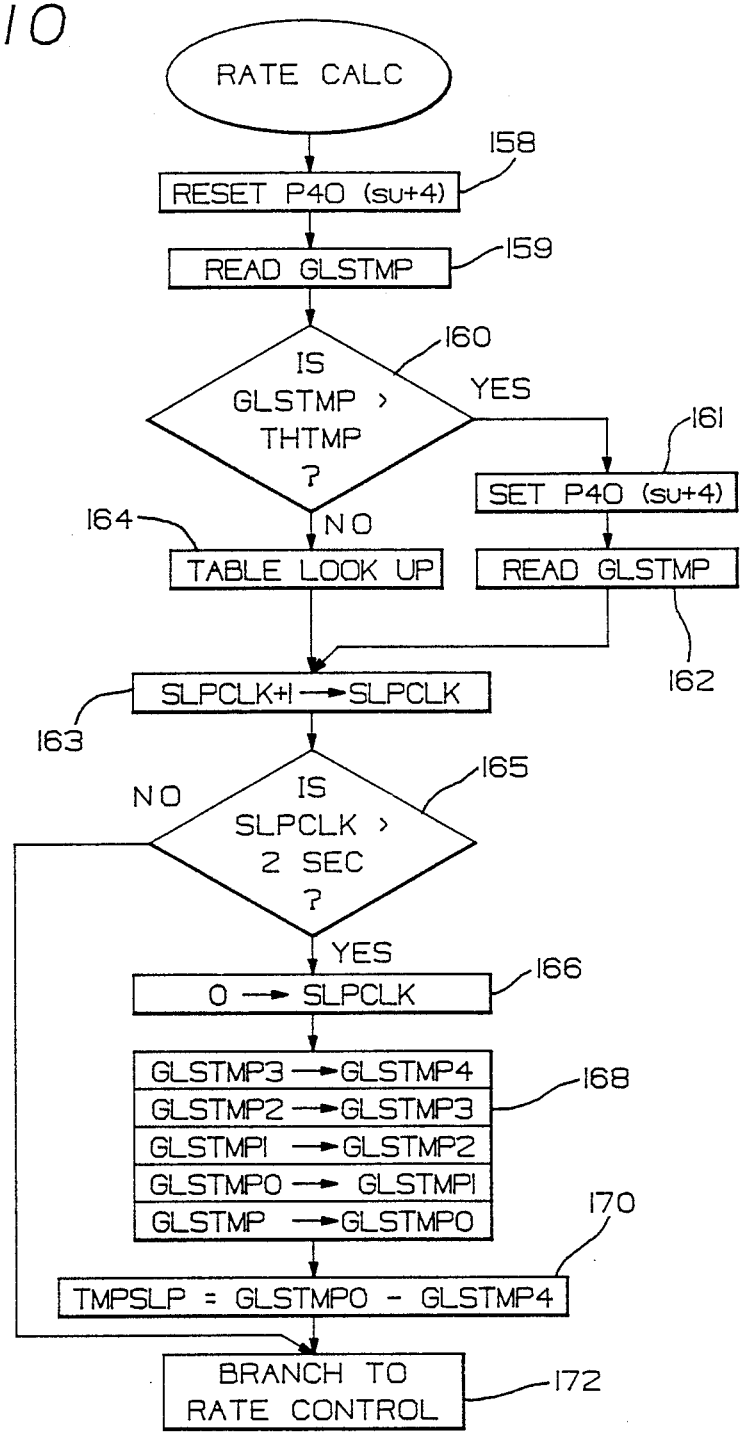
FIG. 10 is a flow diagram of the Rate Calc routine incorporated in the control program of the microprocessor in the circuit of FIG. 7.

Referring to the flow diagram of FIGS. 9A nd 9B, Inquiry 120 first determines if KB represents a blank signifying that no key is presently actuated. If KB is blank, the system branches to the Decode 2 sub-routine (FIG. 9B). In the Decode 2 sub-routine Inquiry 122 determines if the On flag is set. If the On flag is not set, the power level stored in PWD is assigned to the variable PLVL (Block 124). If the On flag is set, Inquiry 126 determines if the previously selected power setting presently stored as PWD is the Off setting. If not, the system is presently operating at one of power settings 1 through 9 and the program proceeds to assign the value of PWD to PLVL (Block 124) and branches (Block 128) to the Rate Calc routine (FIG. 10). If Inquiry 126 determines that PWD equals 0 representing an Off power level, this indicates that the user has switched from Off to On and the ON timer is decremented (Block 130). When On timer equals 0 as determined at Inquiry 132 signifying that the time to enter a valid power level has expired, the On flag is cleared (Block 134) and program proceeds to Block 124 as before.

Referring again to FIG. 9A, if KB is not a blank, Inquiry 135 determines if the new entry is the Off setting. If so, the On flag is cleared (Block 136) and the variable PWD is assigned the value 0 representing the Off power setting (Block 138). The variable PLVL is assigned the value of PWD (Block 140) and the program branches (Block 142) to the Rate Calc routine of FIG. 10. If KB is not Off, Inquiry 144 determines if the new entry is the On setting. If it is, the On timer is re-initialized (Block 146). Inquiry 148 checks the state of the On flag. If set, the program proceeds to Block 140. If not set, the flag is set (Block 150) and the PWD is assigned the value 0 which corresponds also to the On setting (Block 152). The program then proceeds to Block 140 as before.

If the answer to Inquiry 144 is No, signifying that the new entry is one of power levels 1 through 9, Inquiry 154 checks the state of the On flag. If it is not set, signifying the user has attempted to go from Off to a power level without first actuating the On key, the new entry is ignored and the program proceeds to Block 140 with PWD unchanged. If the On flag is set, the power setting input is valid, and variable PWD is assigned the new value corresponding to the new entry KB (Block 156).

Having assigned the value of PWD representing the most recent valid user selected power setting to the variable PLVL the system proceeds to the Rate Calc routine (FIG. 10).

RATE CALC Routine—FIG. 10

The function of this routine is to read in the glass ceramic temperature data and to determine the rate of change of the glass-ceramic temperature. Pursuant to reading in the data, this routine generates enable signal to switch the lower resistance into the sensing network when the initial reading signifies a temperature higher than the threshold reference temperature which is set at 750° F. Of course, the A/D readings will differ for the same actual sensed temperature depending upon which of the two resistors is in the circuit when making the reading. For example, for a sensed temperature of 750° F., with the 200K ohm resistor 50 in the circuit the sensor circuit voltage will measure 2.9 volts which is converted by the A/D circuit to an A/D reading of 253; with the 2K ohm resistor 49 in the circuit, for the same actual temperature the sensor circuit voltage will be 9.7 volts which converts to an A/D reading of 7C3. In the microprocessor implementation of the illustrative embodiment, a look-up table is employed when the 200K resistor is in the circuit to convert the A/D reading to the reading equivalent to that generated by the A/D circuit for the same temperature with the low valued resistor 49 in the circuit. In the previous example, the look-up table converts the A/D reading of 253 to 7C3.

The rate of change information determined in this routine is used in the temperature limiting routines described in the aforementioned patent U.S. Pat. No. 4,740,664. The rate calculation is repeated every two seconds to provide a rapid control response. However, the rate of change is calculated by measuring the difference between glass-ceramic temperature measurements separated by eight seconds. The eight second separation provides a more accurate rate determination. These time intervals provide satisfactory results in the illustrative embodiment.

Referring to the flow diagram of FIG. 10, first that one of the I/O ports P404–P407 for the particular heating unit for which the program is then executing, identified by index (SU+4), is reset (Block 158). Next, the glass-ceramic temperature input from A/D converter is then read in (Block 159) and stored as the variable designated GLSTMP. Inquiry 160 compares this temperature to threshold temperature of 750° F. represented by the variable THTMP. If the sensed temperature is higher than the threshold reference value, I/O port P40(SU+4) is set (Block 161) to switch low value resistor 49 (FIG. 7) into the circuit. The temperature input from the A/D converter is read in again (Block 162) with the low valued resistor in the circuit and stored as variable GLSTMP. If the sensed temperature is lower than THTMP, the value of GLSTMP entered at Block 159 using the high valued resistor 50 (FIG. 7) is converted via the look-up table (Block 164). The converted value is stored as GLSTMP and the program proceeds.

A two second timer SLPCLK is incremented (Block 163). At two second intervals (Inquiry 165) the timer is reset (Block 166).

As shown as Block 168, when the rate of change is to be updated, the current value of GLSTMP is stored as GLSTMPO, the previous reading is stored as GLSTMP1; the previous GLSTMP1 is stored as GLSTMP2; the previous GLSTMP2 is stored as GLSTMP3, and the previous GLSTMP3 is stored as GLSTMP4. By storing temperature measurements every two second in this fashion, the time span between the most recent temperature measurement GLSTMP0 and the oldest stored temperature measurement GLSTMP4 is approximately eight seconds.

The rate of change of temperature, TMPSLP, is calculated as the difference between the most recent measurement and the oldest stored measurement (Block 170). This difference is proportional to the rate of change with a proportionality factor of ⅛. After reading in the temperature data and updating the rate of change calculation as appropriate, the program then branches (Block 172) successively to the Rate Control routine (not shown) and then the Steady State routine (not shown) to implement a temperature limiting function. From the Steady State routine the program branches to the TEMP FH/FC routine (FIG. 11A).

Figure 11A:
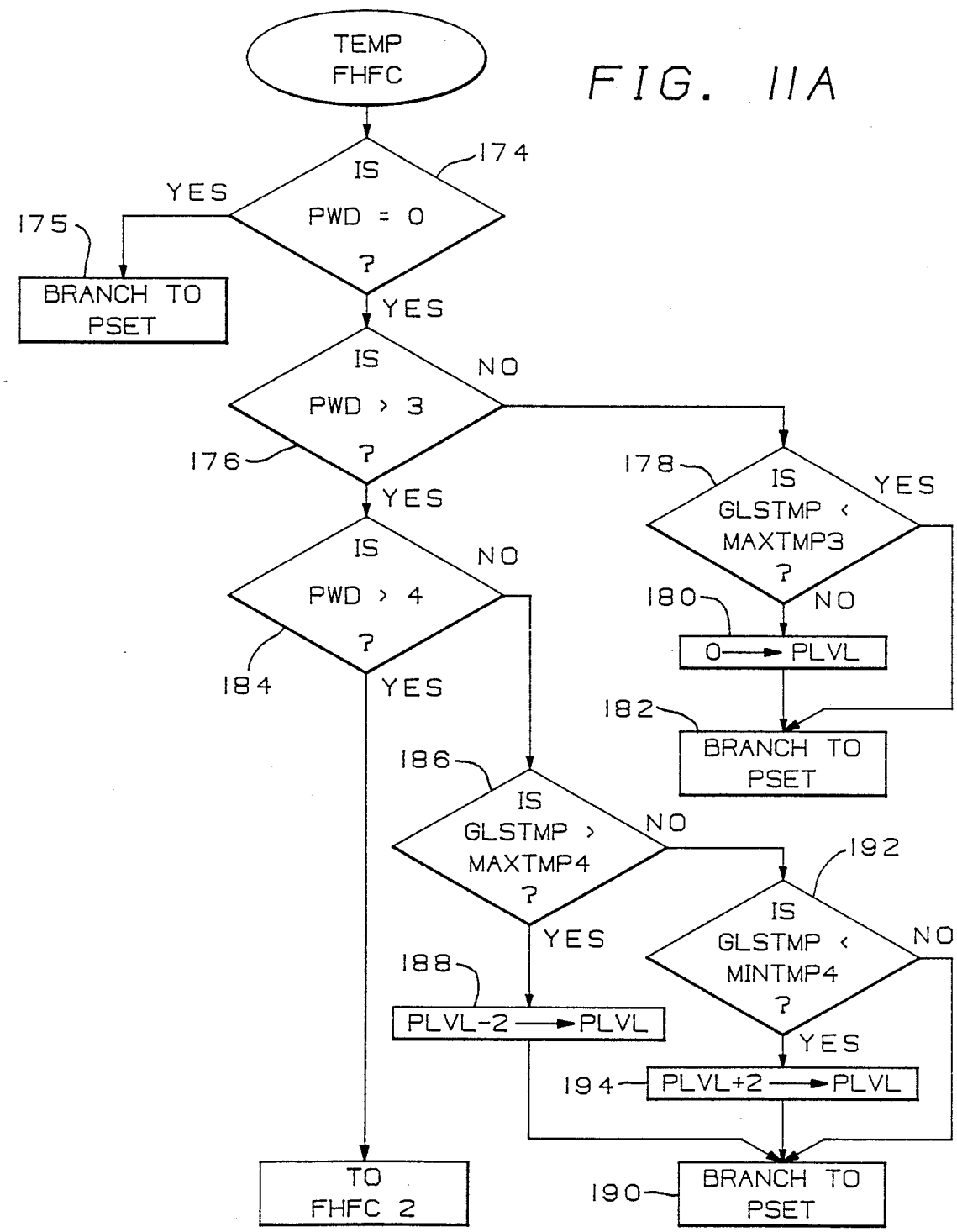
Figure 11B:
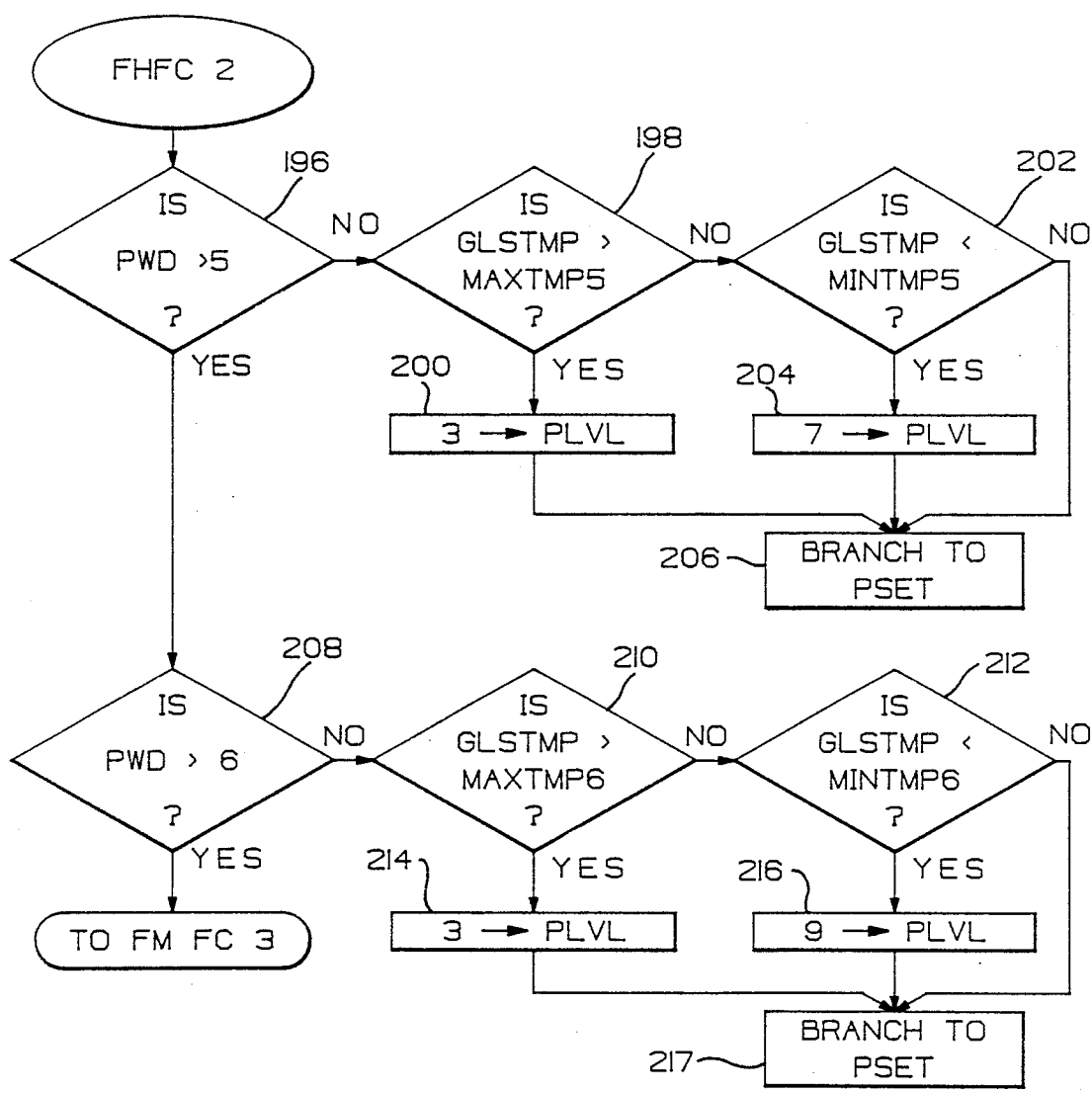

TEMP FH/FC Routine—FIGS. 11A–11C

The function of the TEMP FH/FC routine is to determine if the sensed temperature of the glass ceramic surface is within the steady state temperature range for the user selected power setting and to adjust the power level applied to the heating unit upwardly if the temperature is below the temperature range and downwardly if the temperature is above the temperature range. If the sensed temperature is within the temperature range, no adjustment is made and the steady state power level is applied to the heating unit.

The maximum and minimum reference temperatures lited in Table II are used in this routine. The maximum and minimum reference values for the nth power setting are assigned the variable names MAXTMP (n) and MINTMP (n) respectively.

Figure 12:
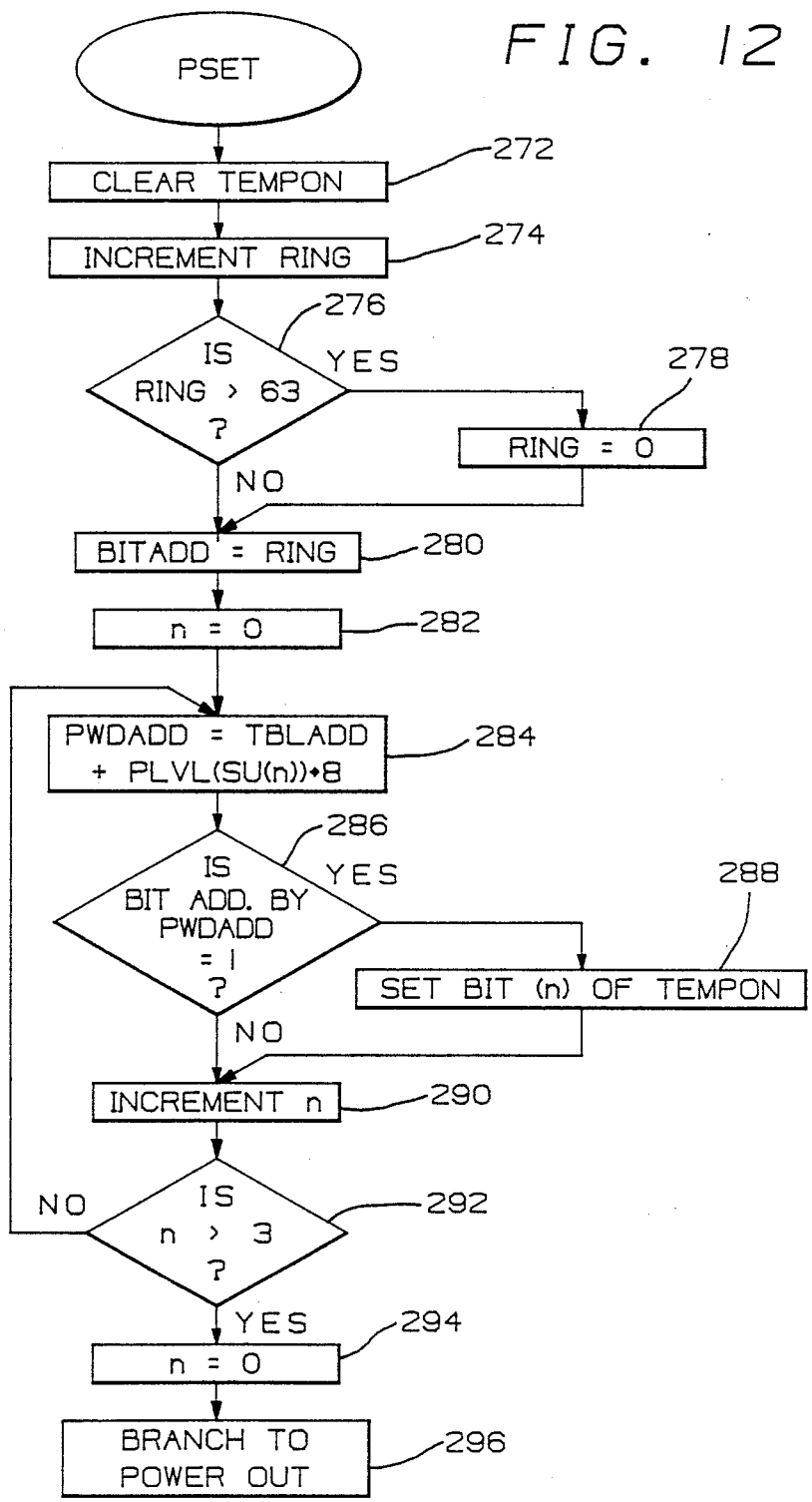
FIG. 12 is a flow diagram of the PSET routine incorporated in the control program of the microprocessor in the circuit of FIG. 7.

Referring now to the flow diagram 11A, Inquiry 174 determines if the selected power setting represented by the variable PWD is 0 representing the OFF setting, in which case no modifications to the power setting is to be made and the program branches immediately (Block 175) to the PSET routine of FIG. 12. If one of power settings 1–9 has been selected, the program proceeds to Inquiry 176.

Inquiry 176 determines if the selected power setting is one of power settings 1–3. If so, Inquiry 178 compares the sensed glass temperature to the maximum reference temperature for power setting 3, GLSTMP3. If the temperature is greater than GLSTMP3, a fast cool mode is initiated by setting PLVL to zero (Block 180); if not, no change is made to PLVL. The program then branches (Block 182) to the PSET routine of FIG. 12. If the selected power setting is higher than power setting 3, Inquiry 184 determines if power setting 4 has been selected. A No response to Inquiry 184 signifies that power setting 4 has been selected. If so, the program proceeds to Inquiry 186 which compares the glass temperature represented by the variable GLSTMP to the maximum temperature for power setting 4. If the sensed temperature is greater than the reference, the applied power level PLVL is reduced by two levels (Block 188) and the program branches (Block 190) to the PSET routine of FIG. 12. If the sensed glass temperature is not greater than the maximum temperature for power setting 4, Inquiry 192 compares the temperature to the minimum temperature for power setting 4. If the sensed temperature is less than the minimum temperature, the applied power level is increased by 2 (Block 194). Otherwise, the program branches (Block 190) to the PSET routine. If the selected power setting is higher than power setting 4, the program proceeds to entry point FHFC2 at FIG. 11B. Inquiry 196 determines if the selected power setting is greater than power setting 5. A No response to Inquiry 196 signifies power setting 5 has been selected and the program proceeds to Inquiry 198, which compares the sensed temperature to the maximum reference temperature for power setting 5. If the sensed temperature exceeds the maximum temperature, the applied power level is reduced by 2 (Block 200). Otherwise, Inquiry 202 compares the sensed glass temperature to the minimum reference temperature for power setting 5. If the sensed temperature is less than the minimum, the power level to be applied is increased by 2 (Block 204); otherwise, no change is made to the power level to be applied and the program branches (Block 206) to the PSET routine of FIG. 12.

Referring again to Inquiry 196, if Yes, the program proceeds to Inquiry 208. A No response signifies that power setting 6 has been selected. Inquiries 210 and 212 compare the sensed glass temperature to the maximum and minimum reference temperatures for power setting 6 respectively. If the maximum reference is exceeded, the power level is reduced by 3 (Block 214). If the sensed temperature is less than the minimum reference temperature, the power level is increased by 3 (Block 216). Otherwise, no change is made to the power level and the program branches (Block 217) to the PSET routine.

Referring back to Inquiry 208, if the response to Inquiry 208 is a Yes signifying a power setting greater than 6 has been selected, the program proceeds to entry point FHFC3 of FIG. 11C.

A No response to Inquiry 218 signifies power setting 7 has been selected. Inquires 220 and 222 compare the sensed glass temperature to the maximum and minimum reference temperatures for power setting 7 respectively. If the glass temperature exceeds the maximum reference temperature, the power level is decreased by 3 (Block 224) and the program branches (Block 228) to the PSET routine of FIG. 12. If the sensed glass temperature is less than the minimum reference temperature for power setting 7, the power level 9 representing an increase of 2 power levels is applied (Block 226). Otherwise, no adjustment is made to power level and the program branches to the PSET routine (Block 228).

If the power setting is greater than 7, the program proceeds to Inquiry 229 which checks for the selection of power setting 8. If the response to Inquiry 229 is No, signifying power setting 8 has been selected, Inquiries 230 and 232 compare the sensed glass temperature to the maximum and minimum reference temperatures respectively for power setting 8. If the glass temperature exceeds the maximum reference temperature, the power level is decreased by 3 (Block 234) and the program branches (Block 236) to the PSET routine. If the glass temperature is less than the minimum reference temperature, the power level is increased by 1 to maximum power level 9 (Block 238), and the program branches (Block 236) to the PSET routine. If the sensed temperature is not less than the minimum reference temperature, no adjustment is made to the power level and the program branches (Block 236) to the PSET routine.

PSET Routine—FIG. 12

Having established the appropriate power level to be applied to the heating unit, it remains to make the triac triggering decision for the next occurring power signal cycle. This decision is made for each of the four heating units during each pass through the control program. Use is made in this routine of information from each of the four heating unit RAM files each time through the routine. It will be recalled that the power pulse repetition rate for each power level is defined by the bit pattern of a 64-bit word with the logical one bit representing an On cycle and logical zero representing an Off cycle. The bits of the word representing the power level to be applied to the heating unit are tested sequentially with one bit being tested each pass through this routine. The state of that tested bit determines whether the triac for the corresponding heating unit will be triggered on or not in the next power signal cycle.

This routine performs a Table Look-Up function to find the appropriate control word and then checks the state of the appropriate bit in that for each of the four surface units. The triac triggering information is then stored in a four-bit word designated TMPON, which is used in the Power Out routine (FIG. 13) to generate the appropriate triac trigger signals.

The variable TBLADD represents the address in RAM of the starting location for the look-up table containing the 64-bit control words. The address and associated bit pattern in Hex representation is shown in Table I. Each of the 16 digits in the code as shown for each control word is the hexidecimal representation of four binary bits.

The variable designated BITADD represents the location within the 64 bit control word of the bit to be tested with 0 and 63 corresponding to the location of the most significant bit and least significant bit respectively.

An indexing variable n is used to iterate the table look-up loop four times during each pass through the routine, once for each heating unit. The variable PWDADD is the address of the control word representing the power level to be applied to the $n^{th}$ heating unit. As can be seen in Table I, the address for any particular power word is obtained by multiplying the value of PLVL for its associated power level, which is a number 0 through 9, multiplied by a factor of 8 and adding this to TBLADD.

Referring to FIG. 12, on entering this routine the control word TMPON is cleared (Block 272) and a ring counter which counts from 0 to 63 is incremented. Inquiry 276 determines if the counter is greater than its maximum count of 63. If so, it is reset to 0 (Block 278). Next BITADD is set equal to the count of the ring counter thereby defining the location within the control word for the bit to be tested for each heating unit (Block 280). The same bit location is tested for each of the heating units.

Figure 13:
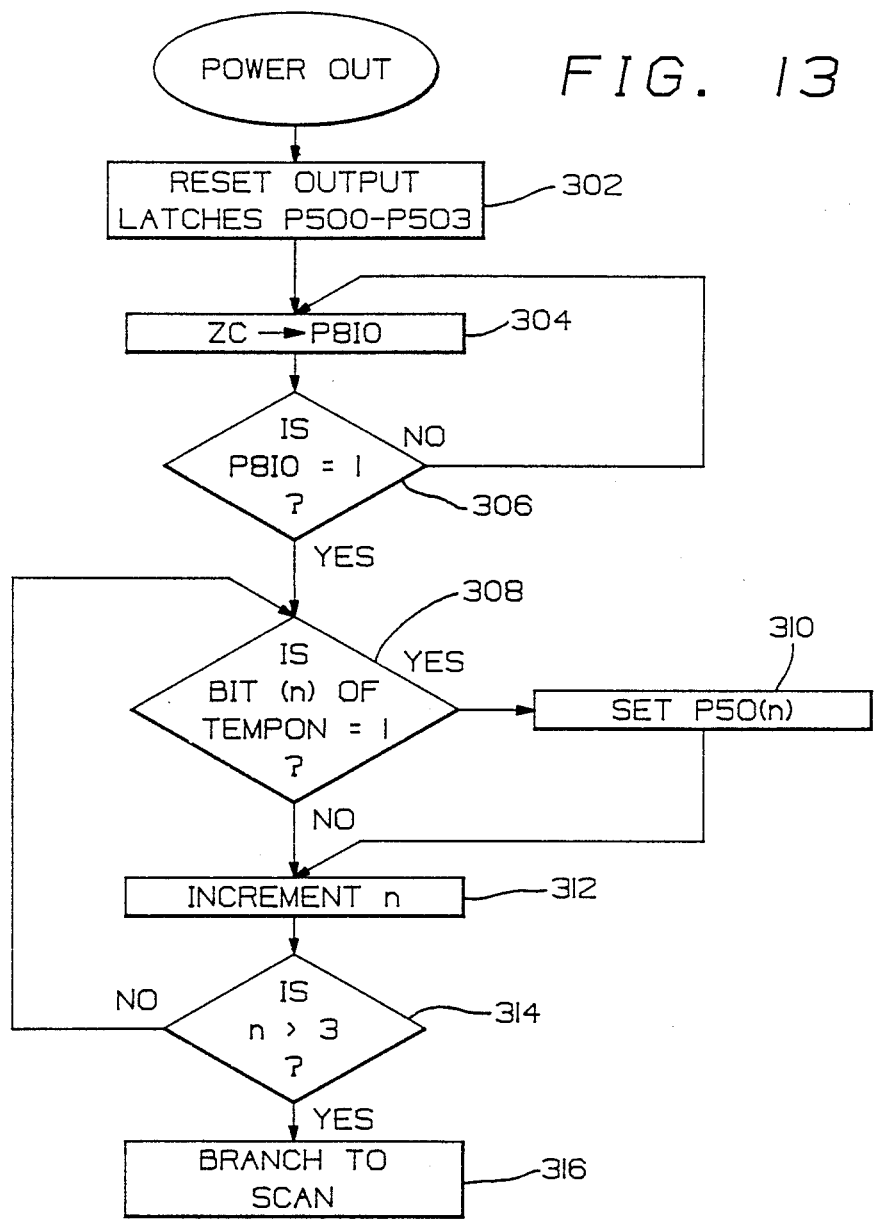
FIG. 13 is a flow diagram of the Power Out routine incorporated in the control program of the microprocessor in the circuit of FIG. 7.

The variable n is initialized to zero at Block 282. PWDADD for the power level to be applied to the $n^{th}$ heating unit is determined at Block 284. The state of the bit location defined by the variable BITADD in the control word located at the address PWDADD is then tested (Inquiry 286). If the tested bit is a logical 1, the $n^{th}$ bit of the control word TMPON is set (Block 288). Otherwise, the $n^{th}$ bit of TMPON will remain 0. After the index n is incremented (Block 290) the value of n is checked (Inquiry 292). If greater than 3, signifying that the loop comprising Blocks 284, 288 and 290 and Inquiries 284 and 286 has been iterated four times, n is reset (Block 294) and the program proceeds to the Power Out routine (FIG. 13). If n is not greater than 3, the program returns to Block 284 to test the bit for the power word for the next heating unit. After the appropriate state for all four bits of the variable TMPON have been established, the program branches (Block 296) to the Power Out routine (FIG. 13).

POWER OUT Routine—FIG. 13

The function of this routine is to trigger triacs 24(a)—24(d) to implement of the triac triggering decision for the next power cycle for each of the four heating units. The triggering of the triacs is synchronized with the positive going zero crossings of the power signal.

Referring now to the routine in FIG. 13, on entering this routine the output latches P500-P503, which control the triacs, are reset (Block 302). Next the program reads in the input from the input port P8I0 representing the state of the zero cross detector (Block 304) and Inquiry 306 checks the state of this input until it switches to a logical 1 signifying the occurrence of a positive going zero crossing of the power signal. When P810 equals 1, the program proceeds to Inquiry 308 to sequentially check the four bits of the power word TMPON and set the appropriate one of output latches P500-P503. Index variable n is again used to sequentially check bits 0 through 3. It will be recalled that prior to branching from the PSET routine the n is reset to 0. Inquiry 308 tests the $n^{th}$ bit for a 1. If it is a 1, the output P50(n) is set (Block 310), n is incremented (Block 312) and Inquiry 314 checks for an n greater than 3. If n is less than 3, the program returns to Inquiry 308 to check the next bit and set the corresponding output port as appropriate. Those ones of output latches P500-P503 associated with bits in the variable TMPON which are in the logical one state are set. Those ones with output latches associated with zero bits in TMPON are not set. In the latter case these latches remain in the reset state since each of the latches is reset upon entering this routine.

In this fashion each bit of the control word TMPON is tested each pass through the Power Out routine, and a decision to trigger or not trigger each triac is carried out during each pass through the control program. Once the loop comprising Inquiries 306 and 312 and Blocks 308 and 310 is iterated four times, once for each heating unit, the power control decision for the next power cycle has been implemented and the program returns to the Scan routine to execute the program for the next heating unit.

In the power control arrangement herein described, it is contemplated that the control functions of the present invention be implemented in cooperation with the temperature limiting functions at least to the extent that the temperature limiting function overrides the fast heat/fast cool functions. It will be appreciated, however, that the fast heat/fast cool function is readily implementable in a power control system in which the temperature limiting function is performed in a totally different manner, if at all. For example, in the system of the illustrative embodiment, this could be achieved by simply deleting the Rate Control and Steady State Control routines entirely from the ROM of microprocessor 40 and retaining only that portion of the Rate Calc routine in ROM which reads in and stores the glass ceramic temperature measurement data.

While in accordance with the Patent Statutes a specific embodiment of the present invention has been illustrated and described herein, it is realized that numerous modifications and changes will occur to those skilled in the art. For example, the illustrative embodiment employs infrared heating units. However, the invention could also be used in conventional conduction cooktops as well. It is therefore to be understood that the appended claims are intended to cover all such modifications and changes as fall within the true spirit and scope of the invention.

What is claimed is:

1. In a household cooking appliance of the type having a glass ceramic cooking surface for supporting loads to be heated, and at least one radiant heating unit disposed beneath the glass ceramic cooking surface to heat loads supported thereon, a power control system comprising:

temperature sensing means for sensing the temperature of the underside of the glass ceramic support surface proximate the heating unit;

user actuable input selection means for enabling the user to select one of a plurality of power settings for the heating unit;

at least one of said plurality of power settings having associated with it predetermined maximum and minimum reference temperatures defining a temperature band representative of the steady state temperature range of the underside of the glass ceramic support surface proximate the heating unit when heating loads at that power setting; and power control means responsive to the input selection means, operative to operate the heating unit at a steady state power level corresponding to the user selecting power setting;

said power control means including means responsive to said temperature sensing means for operating the heating unit at a power level other than the power level corresponding to the user selected power setting when the sensed glass ceramic support surface temperature is outside said predetermined reference temperature band associated with the selected power setting to cause the heating unit to respond quickly to changes in the user selected power setting.

2. The power control system of claim 1 wherein said means responsive to said temperature sensing means for operating sad heating unit at a power level other than the power level associated with the user selected power setting is operative to apply a power level higher than the power level associated with the user selected power setting when the sensed temperature is below said predetermined temperature band for the selected power setting and to apply a power level lower than the power level associated with the user selected power setting when the sensed temperature is above said predetermined temperature band.

3. A power control system for a household cooking appliance of the type having a glass ceramic cooking surface for supporting loads to be heated and at least one radiant heating unit disposed beneath the glass ceramic cooking surface to heat loads supported on the cooking surface, said power control system comprising:

temperature sensing means for sensing the temperature of the underside of the glass ceramic support surface approximate the heating unit;

user actuable input selection means for enabling the user to select one of a plurality of power settings for the heating unit;

at least one of said plurality of power settings having associated with it predetermined maximum and minimum reference temperatures defining a temperature band representative of the steady state temperature range of the underside of the glass ceramic support surface proximate the heating unit when heating loads at that power setting; and power control means responsive to the input selection means for operating the heating unit at a predetermined steady state power level corresponding to the user selected power setting including means responsive to said temperature sensing means operative to operate the heating unit at a power level higher than the power level corresponding to the user selected power setting when the sensed glass ceramic support surface temperature is less than said minimum reference temperature and to operate the heating unit at a power level less than the power level corresponding to the user selected power setting when the sensed glass ceramic support surface temperature is higher than the said maximum reference temperature to reach steady state operating conditions associated with the newly selected power setting.

4. The power control system of claim 3 wherein said minimum reference temperature represents a temperature level which the system will normally at least reach under steady state conditions when heating a relatively dark flat bottomed utensil at the steady state power level for selected power setting and the maximum reference temperature corresponds to a temperature which would normally not be exceeded when heating a relatively bright aluminum utensil having a warped bottom surface when at said corresponding power level.

5. The power control system of claim 4 wherein said means for operating the heating unit at power levels other than the power level corresponding to the selected power setting is operative to operate the heating unit at a predetermined number of power levels higher than the power level selected when the sensed glass ceramic support surface temperature is less than said minimum reference temperature and a predetermined number of power levels lower than the steady state power level associated with the selected power setting when the sensed glass support surface temperature is greater than said maximum reference temperature for the selected power setting.

6. A method of controlling the output power of a heating element in a cooking appliance of the type in which the radiant heating element is disposed beneath a glass ceramic cooking surface for supporting loads to be heated by the element, said method comprising the steps of:

sensing the temperature of the underside of the glass ceramic support surface proximate the heating unit;

comparing the sensed temperature to a predetermined temperature range associated with the selected power setting;

operating the heating unit at a power level higher than the steady state power level associated with the selected power setting with the sensed glass temperature is less than the predetermined temperature range;

applying a power level to the heating unit lower than the steady state power level associated with the selected power setting when the sensed glass temperature is greater than the predetermined range; and applying the steady state power level associated with the user selected power setting to the heating unit when the sensed temperature lies within the predetermined range associated with the selected power setting.

7. The method of claim 6 wherein the predetermined glass ceramic support surface temperature range for each of said user selectable power settings is defined by a minimum reference temperature representing the temperature which will normally be reached when heating a relatively dark flat bottomed pan at the power level associated with the user selected power setting and a maximum reference temperature representative of the temperature which will normally not be exceeded by a pan having a warped relatively bright aluminum bottom surface when operated at the power level associated with the selected power setting.

* * * * *